(12) United States Patent
Lissel et al.

(10) Patent No.: US 7,165,125 B2
(45) Date of Patent: Jan. 16, 2007

(54) BUFFER SHARING IN HOST CONTROLLER

(75) Inventors: Robert Lissel, Reutlingen (DE); Bernd Schönfelder, Weinböhla (DE); Frank Barth, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 488 days.

(21) Appl. No.: 10/817,572

(22) Filed: Apr. 2, 2004

(65) Prior Publication Data

US 2005/0120150 A1     Jun. 2, 2005

(30) Foreign Application Priority Data

Nov. 28, 2003   (DE) .............................. 103 55 583

(51) Int. Cl.
  *G06F 31/20*   (2006.01)
  *G06F 13/00*   (2006.01)

(52) U.S. Cl. ...................... 710/22; 710/52; 710/308; 710/310

(58) Field of Classification Search ............... 710/5–7, 710/20–28, 33–35, 52–57, 308–310
See application file for complete search history.

(56) References Cited

U.S. PATENT DOCUMENTS

| | | | |
|---|---|---|---|
| 4,847,812 A | | 7/1989 | Lodhi |
| 5,592,682 A | * | 1/1997 | Chejlava et al. ............... 710/3 |
| 5,603,052 A | * | 2/1997 | Chejlava et al. ............... 710/4 |
| 5,610,808 A | | 3/1997 | Squires et al. |
| 5,630,171 A | * | 5/1997 | Chejlava et al. ............... 710/23 |
| 5,655,154 A | * | 8/1997 | Jain et al. .................... 719/310 |
| 5,826,107 A | * | 10/1998 | Cline et al. ................... 710/27 |
| 6,567,953 B1 | * | 5/2003 | Pomerantz .................. 714/805 |
| 6,629,230 B1 | | 9/2003 | Hashimoto et al. |
| 6,708,233 B1 | | 3/2004 | Fuller et al. |
| 6,715,004 B1 | * | 3/2004 | Grimsrud et al. ............. 710/35 |

FOREIGN PATENT DOCUMENTS

EP       0202675       5/1986

OTHER PUBLICATIONS

Translation into English of Office Action, Application No. 103 55 853.8-53, Jan. 5, 2006.

* cited by examiner

*Primary Examiner*—Christopher Shin
(74) *Attorney, Agent, or Firm*—Meyertons Hood Kivlin Kowert & Goetzel, P.C.; B. Noël Kivlin

(57) ABSTRACT

A storage device host controller such as an SATA (Serial ATA) host controller and a corresponding method are provided for performing host-to-device and device-to-host communications in a PIO (Programmed I/O) data transfer mode and a DMA (Direct Memory Access) data transfer mode. The host controller comprises a buffer unit for buffering data and a data stream selection unit for selecting a data stream for submission to the buffer unit. The data stream selection unit is connected to receive at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode, and select from the received data streams the data stream to be submitted to the buffer unit.

49 Claims, 8 Drawing Sheets

BUFFER SHARING IN HOST CONTROLLER

BACKGROUND OF THE INVENTION

1. Field of the Invention

The invention generally relates to controlling data transfer to and/or from storage devices, and in particular to SATA (Serial ATA) controllers.

2. Description of the Related Art

In computer systems, hard disks and other drives such as CD or DVD drives, tape devices, high capacity removeable devices, zip drives, and CDRW drives are storage devices that may be connected to the computer via an interface for defining the physical and logically requirements for performing data transfer to and from the devices. One of the most popular interfaces used in modern computer systems is the one most commonly known as IDE (Integrated Drive Electronics). The IDE drive interface, more properly called AT (Advanced Technology) Attachment (ATA) interface, was developed starting in 1986 and was standardized around 1988. The specification which provides a way to make disk drive "attachments" to the PC (Personal Computer) architecture, was further developed to a variety of more recent specifications such as ATA/ATAPI, EIDE, ATA-2, Fast ATA, ATA-3, Ultra ATA, Ultra DMA (UDMA), ATA-4 and many more as well. All of these specifications define storage interfaces for connecting to parallel storage devices and are referred to as being ATA compliant hereafter.

While the parallel ATA interconnect has been the dominant internal storage interconnect for desktop and mobile computers because of its relative simplicity, high performance, and low cost, ATA compliant interfaces have a number of limitations that are exhausting their ability to continue increasing performance.

Some of these limitations are the 5-volt signalling requirement, and the high pin count. These and other characteristics of parallel ATA interfaces are the reasons why such interfaces cannot scale to support several more speed doublings as happened in the past, so that this interface is nearing its performance capacity.

For this reason, and to provide scaleable performance for the next decade, serial ATA (SATA) was developed as a next generation ATA specification. SATA is an evolutionary replacement for the parallel ATA physical storage interface and is designed to be 100% software compatible with today's ATA, but to have a much lower pin count, enabling thinner, more flexible cables. Because of the maintained software compatibility, no changes in today's drivers and operating systems are required. Moreover, the lower pin count also benefits the system design of motherboards and their chipsets and other integrated silicon components.

As mentioned above, one of the key features of the SATA interface is the software compatibility to parallel ATA controllers. This can be better understood from a comparison of FIGS. 1 and 2 which illustrate standard ATA and the serial ATA (SATA) connectivity, respectively.

Turning first to FIG. 1 which depicts how ATA compliant parallel storage devices are connected to a computer system to enable data transfer to and from the devices, the computer system includes an operating system 115 that is the main software running on the computer. There may further be multiple application programs 100, 105, 110 which usually have a user interface for providing information to the user and receiving input. Of course, application programs with no user interface exist as well. Further, there is usually a driver software 120 provided which may be an extra software component, or part of the operating system 115, and which is run specifically to interact with ATA compliant hardware.

This hardware includes the ATA adapter 125 which exchanges data signals with devices 135, 140 over a parallel port 130. The ATA adapter 125 is also called ATA controller, often together with the parallel port 130.

Referring now to FIG. 2 which illustrates the corresponding parts of a computer system having an SATA interface, there are no changes required in the application programs 100, 105, 110, the operating system 115, nor the driver 120. On the hardware side, an SATA adapter 200 is provided that is connected to one or more serial ports 210, 215 for exchanging signals with serial devices 220, 225. That is, while only one SATA adapter 200 is shown in FIG. 2, other arrangements comprise an individual SATA adapter 200 for each device 220, 225. The SATA enabled computer system of FIG. 2 differs from the system of FIG. 1 in that the devices and ports are serialized, and an appropriate SATA compliant adapter 200 is provided. Focusing in more detail to this adapter, it can be seen, that the SATA adapter 200 may be understood as comprising an ATA adapter 125, being accompanied with a parallel/serial converter 205 to perform parallel-to-serial and serial-to-parallel conversion of data signals.

As neither in the operating system 115 nor in the driver software 120 specific adaptations to the SATA specification are required, the interface of FIG. 2 is software compatible with the technique of FIG. 1. Thus, SATA is a drop-in solution, and today's software will run on the new architecture without modification. Given this feature and the above described other advantages, and further taking into account that SATA compliant controllers and devices will be of about the same costs as conventional units, SATA is expected to eventually completely replace parallel ATA interfaces. SATA's adoption by the industry will follow a phased transition path, and there will be a point where both parallel and serial ATA capabilities are available.

In SATA host controllers and other storage device host controllers, there are data communications in two directions, from the host to the device and from the device to the host. Moreover, for each direction there may be two possible data transfer modes: the DMA (Direct Memory Access) mode and the PIO (Programmed I/O) mode. Operating the host controller in the PIO mode is usually done for backwards compatibility reasons. Taking the two possible data transfer modes and the two communication directions, such host controller needs to manage four different data streams.

This has been shown to lead to a number of disadvantages. For instance, the requirement to handle four different data streams makes it necessary to provide circuitry specifically suited for each individual stream. This increases the amount of circuitry on an integrated circuit chip, leading to increased manufacturing costs. Further, since all of the specific circuitry needs to be adapted to the overall architecture, there is a significant decrease in efficiency.

SUMMARY OF THE INVENTION

An improved host controller technique is provided that may improve efficiency and circuit density without increasing the cost of manufacturing.

In one embodiment, an SATA host controller is provided that is capable of performing host-to-device and device-to-host communications. The controller is operable in a PIO data transfer mode and a DMA data transfer mode. The host controller comprises a buffer unit for buffering data and a data stream selection unit for selecting a data stream for submission to the buffer unit. The data stream selection unit is connected to receive at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode. The data stream selection unit is further adapted to select from the received data streams the data stream to be submitted to the buffer unit.

In another embodiment, a storage device host controller is provided that is capable of performing host-to-device and device-to-host communications. The host controller is operable in a programmed input/output data transfer mode and a direct memory access data transfer mode. The host controller comprises a buffer unit for buffering data and a data stream selection unit for selecting a data stream for submission to the buffer unit. The data stream selection unit is connected to receive at any one time at least one of a host-to-device data stream in the programmed input/output data transfer mode, a host-to-device data stream in the direct memory access data transfer mode, a device-to-host data stream in the programmed input/output data transfer mode, and a device-to-host data stream in the direct memory access data transfer mode. The data stream selection unit is further adapted to select from the received data streams the data stream to be submitted to the buffer unit.

In a further embodiment, there is provided an integrated circuit chip for performing host-to-device and device-to-host ATA communications, the integrated circuit chip being operable in a PIO data transfer mode and a DMA data transfer mode. The integrated circuit chip comprises a buffer circuit for buffering data and a data stream selection circuit for selecting a data stream for submission to the buffer circuit. The data stream selection circuit is connected to receive at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode. The data stream selection circuit is further adapted to select from the received data streams the data stream to be submitted to the buffer circuit.

In yet another embodiment, a method of operating an SATA host controller to perform host-to-device and device-to-host communications in a PIO data transfer mode and a DMA data transfer mode is provided. The method comprises receiving at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode, selecting from the received data streams a data stream to be buffered, and buffering data of the selected data stream in a buffer unit.

In still a further embodiment, there is provided a method of operating a storage device host controller to perform host-to-device and device-to-host communications in a programmed input/output data transfer mode and a direct memory access data transfer mode. The method comprises receiving at any one time at least one of a host-to-device data stream in the programmed input/output data transfer mode, a host-to-device data stream in the direct memory access data transfer mode, a device-to-host data stream in the programmed input/output data transfer mode, and a device-to-host data stream in the direct memory access data transfer mode, selecting from the received data streams a data stream to be buffered, and buffering data of the selected data stream in a buffer unit.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
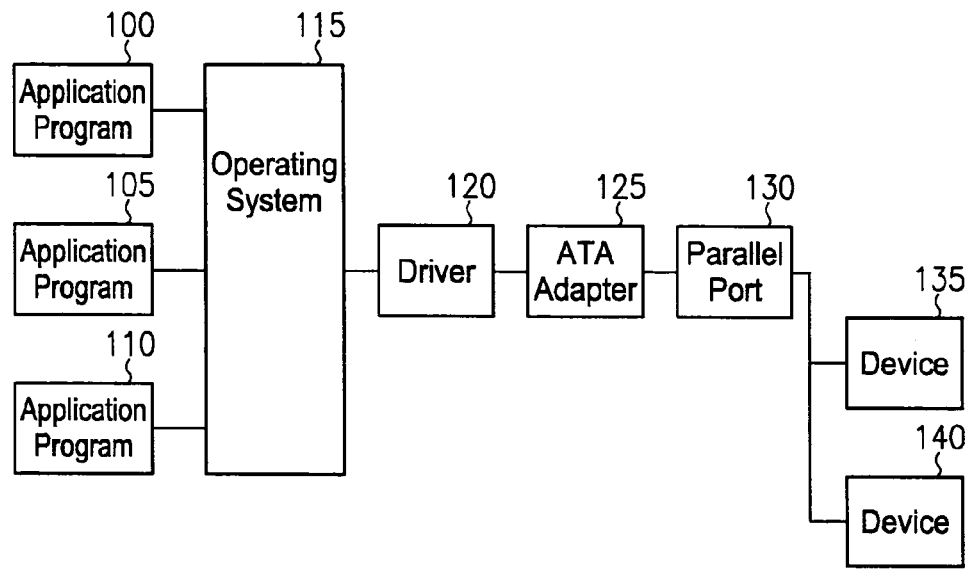
FIG. 1 is a block diagram illustrating standard ATA connectivity.
Figure 2:
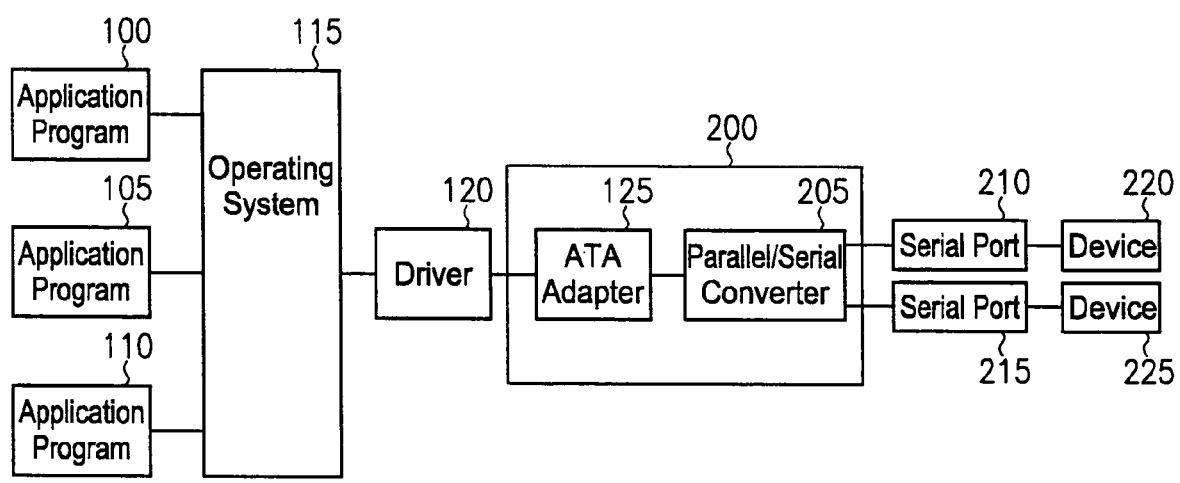
FIG. 2 is a block diagram illustrating standard SATA connectivity.
Figure 3:
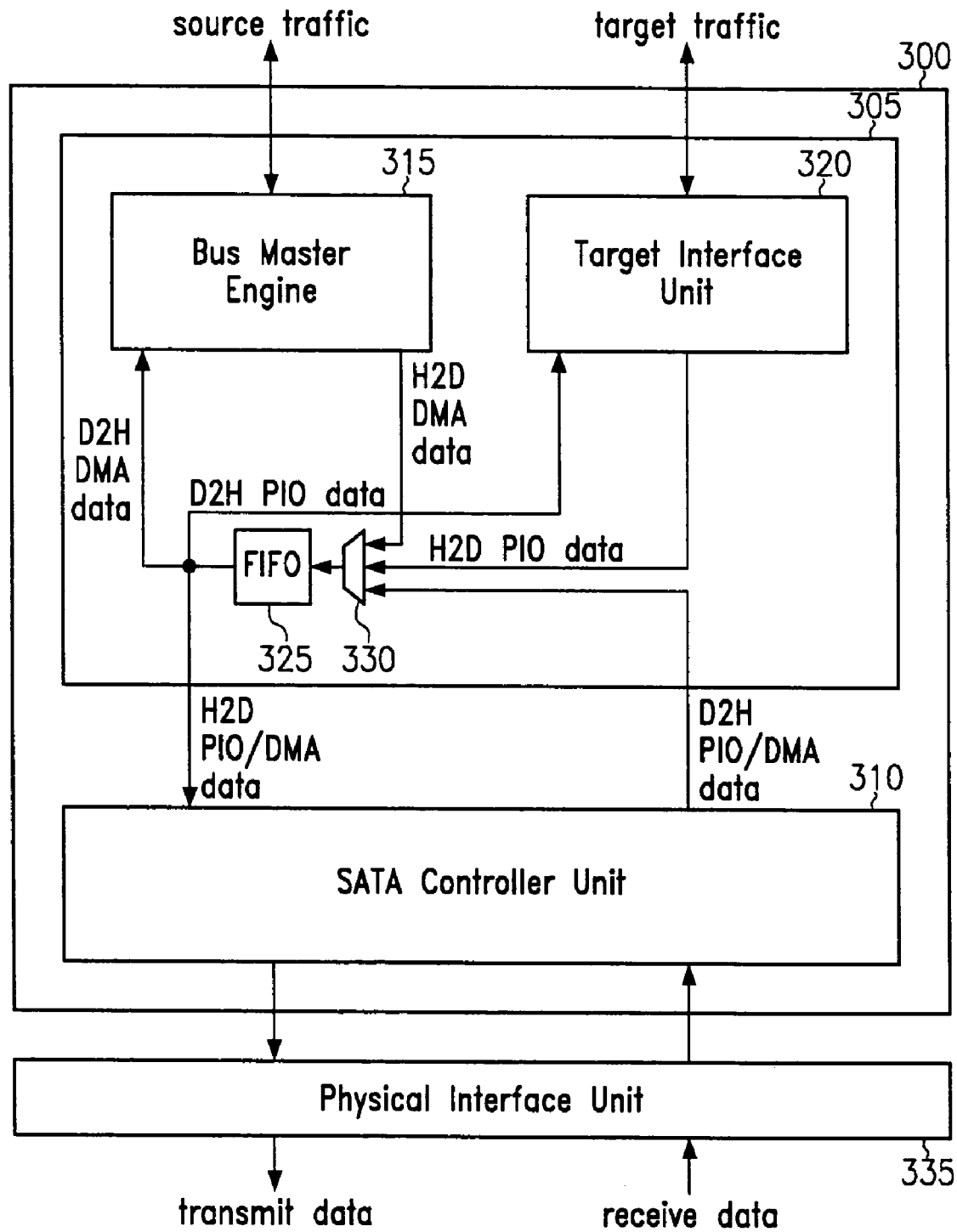
FIG. 3 is a block diagram illustrating an SATA architecture according to an embodiment.

Turning now to the figures and in particular FIG. 3, which illustrates the SATA host architecture according to an embodiment, there is provided an SATA host controller 300 that is connected to a physical interface unit 335. The SATA host controller 300 is divided into two major blocks: the host interface unit 305 and the SATA controller unit 310. The host interface unit 305 provides in the present embodiment an internal high-speed interface to a HyperTransport™ controller which is located upstream. The SATA controller unit 310 may contain a transport, link and physical layer unit as specified in the SATA specification. The physical interface unit 335 may be responsible for serializing/deserializing and transmission/reception of the analog differential signals, and may be completely separated from the SATA host controller 300.

The host interface unit 305 comprises a bus master engine 315 performing DMA transfers by accessing host memory via an internal high-speed source interface, and a target interface unit 320 which may contain a variety of configuration, control and status registers accessed by host software via an internal high-speed target interface.

Due to the two possible data transfer modes (PIO, DMA) for host-to-device and device-to-host communications, four different data streams are managed. As depicted in FIG. 3, the device-to-host PIO and DMA data enters the host interface unit 305 from the SATA controller unit 310. The device-to-host PIO data then reaches the target interface unit 320 while the device-to-host DMA data reaches the bus master engine 315. In the downstream direction, host-to-device PIO data is issued from the target interface unit 320 while host-to-device DMA data comes from the bus master engine 315. In both data transfer modes, the host-to-device data is then forwarded from the host interface unit 305 to the SATA controller unit 310.

As can be seen from FIG. 3, the host interface unit 305 further comprises a buffer unit 325, which may be a FIFO (First In First Out) buffer, and a data stream selection unit 330 which may be a multiplexer. The multiplexer 330 is connected to the bus master engine 315 to receive host-to-device DMA data, to the target interface unit 320 to receive host-to-device PIO data, and to the SATA controller unit 310 to receive device-to-host PIO and DMA data. The multiplexer 330 selects one of the received data streams and submits the selected data to the buffer unit 325. The buffer unit 325 is connected to the bus master engine 315 to provide device-to-host DMA data, to the target interface unit 320 to provide device-to-host PIO data, and to the SATA controller unit 310 to provide host-to-device PIO and DMA data.

Thus, a shared data buffer is provided that can continuously supply data streams at the SATA data link for common operation modes. The buffer technique of the embodiments may ensure that no loss of data occurs in any case unless a system error occurred.

Thus, a buffer technique for SATA host controllers or other storage device controllers is provided where one data buffer is commonly used for PIO and DMA modes in both directions.

When performing host-to-device communications in the DMA data transfer mode, the buffer unit 325 may be specifically adapted to store incoming data from the HyperTransport controller. The bus master engine 315 may then ensure free buffer space available for all outstanding read requests. Each read command may request a maximum dword (double word) count of 16. The number of supported outstanding read requests may then define the size of the buffer unit 325 for host-to-device DMA data.

The reached host-to-device data rate mainly depends on the host latency and the time needed for emptying the buffer 325. Characteristic for the host latency are values between 0.8 µs<$L_H$<1.2 µs. The time needed to read one cacheline out of the data buffer 325 may be estimated for the full SATA data rate of 150 MB/s to be 0.43 µs. Assuming only full cacheline accesses occur, the payload size may be defined by 64 bytes where the time needed for transferring 16 dwords without pausing at 100 MHz clock frequency is 160 ns, the overhead is 40 ns, the average arbitration latency is 0.08 µs, and the host latency is 1.2 µs. The maximum gained data rate as a function of the number of outstanding requests may then be defined to be 33.51 MB/s×n.

Consequently, to gain the full SATA data rate of 150 MB/s with these parameters, at least five outstanding read requests should be supported by the bus master engine 315. The buffer unit 325 of the present embodiment therefore has a minimum buffer size of five cachelines, i.e., 320 bytes. This calculation assumes that all responses arrive in the same sequence they have been requested, forced by the fixed host latency. If, however, responses arrive out of order, they may be reordered before transferring them to the SATA device. This reduces the gained host-to-device DMA data rate calculated above.

The maximum interface data rate may be reached when bursts with the maximum burst length of 16 dwords are requested. This may be ensured by host software, which defines physical region descriptors (PRDs) pointing at large memory regions. Otherwise, the bus master engine 315 may need to also request smaller packets to comply with the rule of cacheline aligned requests.

The full SATA interface data rate of 150 MB/s is supplied for the common operation mode where other devices are connected to the HyperTransport controller and also burst lengths smaller than 16 dwords occur. Hence, the number of supported outstanding requests may be greater than five. In order to ensure the requested data rate, the present embodiment chooses a buffer size of six cachelines, i.e., 96 dwords or 384 bytes, to support six outstanding data read requests.

In the case that the buffer unit 325 in the host-to-device DMA data transfer mode runs empty, the SATA controller unit 310 may insert "hold" primitives into the transmit data stream instead of data.

Discussing now the operational mode where the buffer unit 325 is controlled to handle device-to-host DMA data, the multiplexer 330 selects the incoming device-to-host DMA data stream from the SATA controller unit 310, and the buffer unit 325 outputs the transferred data to the host by the bus master engine 315. The present embodiment further provides a mechanism to avoid buffer overruns in any case.

Figure 4:
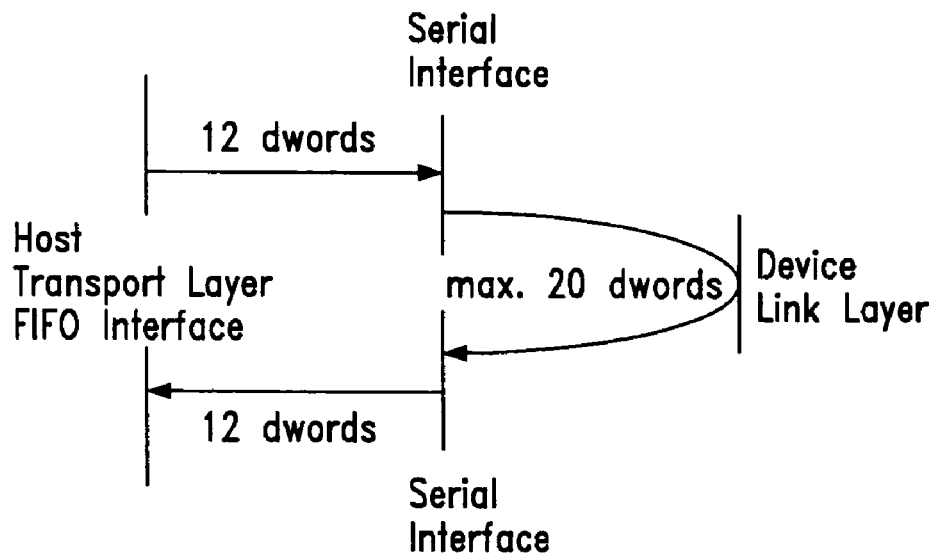
FIG. 4 illustrates an SATA round-trip pipeline when performing device-to-host communications in the DMA data transfer mode.

In the present embodiment, if the buffer unit 325 is about to be filled up, the host sends hold primitives to the device in order to stop the data transfer. The device then responds with specific hold primitives instead of data. However, the data transfer from the device may not be stopped immediately after receiving the hold primitives as it may be possible that up to 20 valid data dwords follow after the host has sent hold primitives to the device across the serial interface. In addition, the SATA host controller 300 itself may have a latency of 12 dwords between recognition of last buffer space and sending the primitives. When receiving data from the serial interface, the same latency may occur until data arrives at the buffer unit 325 within the bus master engine 315. Thus, there may be a 44 dword round-trip pipeline as illustrated in FIG. 4.

Figure 5:
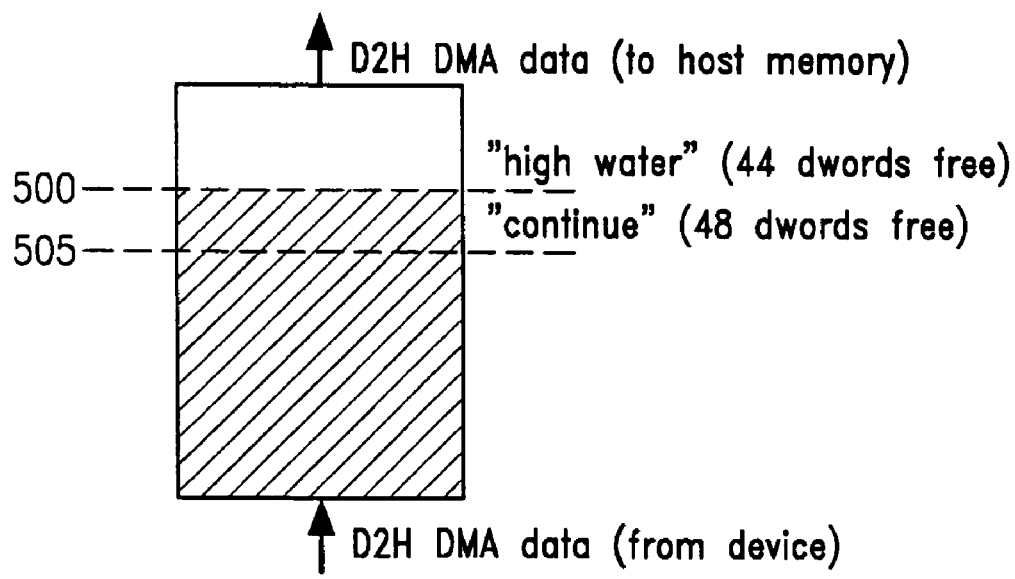
FIG. 5 illustrates buffer fill levels according to an embodiment to be used in device-to-host communications in the DMA data transfer mode.

To handle this situation, the buffer unit 325 of the present embodiment may be adapted to have two pre-defined fill levels when performing device-to-host communications in the DMA data transfer mode. This is illustrated in more detail in FIG. 5.

The "high water" fill level 500 is defined such that 44 dwords are still free to be able to send hold primitives in time. To avoid the data transfer being interrupted again and again, a "continue" fill level 505 is defined to have 48 dwords free. The fill level 505 may be used to specify when the host is allowed to continue data transfer once being interrupted.

In order to not only avoid buffer overruns but also unnecessary hard disk stops for the common operation mode, the HyperTransport controller block arbitration time may be considered. During this time, the buffer unit 325 may not be emptied, but filled with 150 MB/s which results in the maximum of 135 bytes or 33.75 dwords arriving from the SATA device. In order to buffer this amount of data without hitting the "high water" fill level 500, the size of the buffer unit 325 may be set to five cachelines, i.e., 80 dwords or 320 bytes.

Discussing now the PIO data transfer mode of the buffer unit 325, the PIO data performance may be limited by a high CPU load, by a small payload size, and by not using multiple outstanding requests. The present embodiment may therefore simply ensure data integrity in the sense of preventing buffer overruns and underruns. Thus, the SATA flow control mechanism is applied for both device-to-host and host-to-device directions as it is done for DMA accesses.

Hence, the present embodiment makes use of two 32-bit registers for collecting full dwords for host-to-device PIO transfers, and flow control can be applied without further delay by just sending hold primitives instead of data. When using the flow control mechanism for device-to-host PIO data transfers, the SATA round-trip pipeline may be considered as discussed above with reference to FIG. 4. Thus, the data buffer 325 of the present embodiment may be designed to have a buffer depth of at least 45 dwords in the device-to-host PIO data transfer mode.

To summarize, the buffer unit 325 of the present embodiment has a minimum buffer capacity of 384 bytes for host-to-device DMA data, 320 bytes for device-to-host DMA data, 8 bytes for host-to-device PIO data, and 180 bytes for device-to-host PIO data. As the SATA specification may ensure that no two of these four data streams appear concurrently, the embodiments implement only one data buffer used for all data transfers, saving a significant amount of chip area. The depth of the shared buffer 325 may then be defined by the largest minimum buffer capacity, i.e., that calculated for host-to-device DMA transfers.

As already mentioned above, the four data streams are multiplexed by multiplexer 330. The multiplexer 330 uses a select signal that may be generated from the bus master active signal, the bus master read/write select signal, and the PIO read signal from the transport layer unit of the SATA controller unit 310.

The buffer unit 325 may be implemented such that read responses (host-to-device DMA data) requested by the bus master engine 315 arrive out of order and are reordered before transferring them to the SATA controller unit 310. Thus, the internal write address may be manipulated to write the buffer 325 like a RAM (Random Access Memory) device but read it as a common known FIFO.

Figure 6:
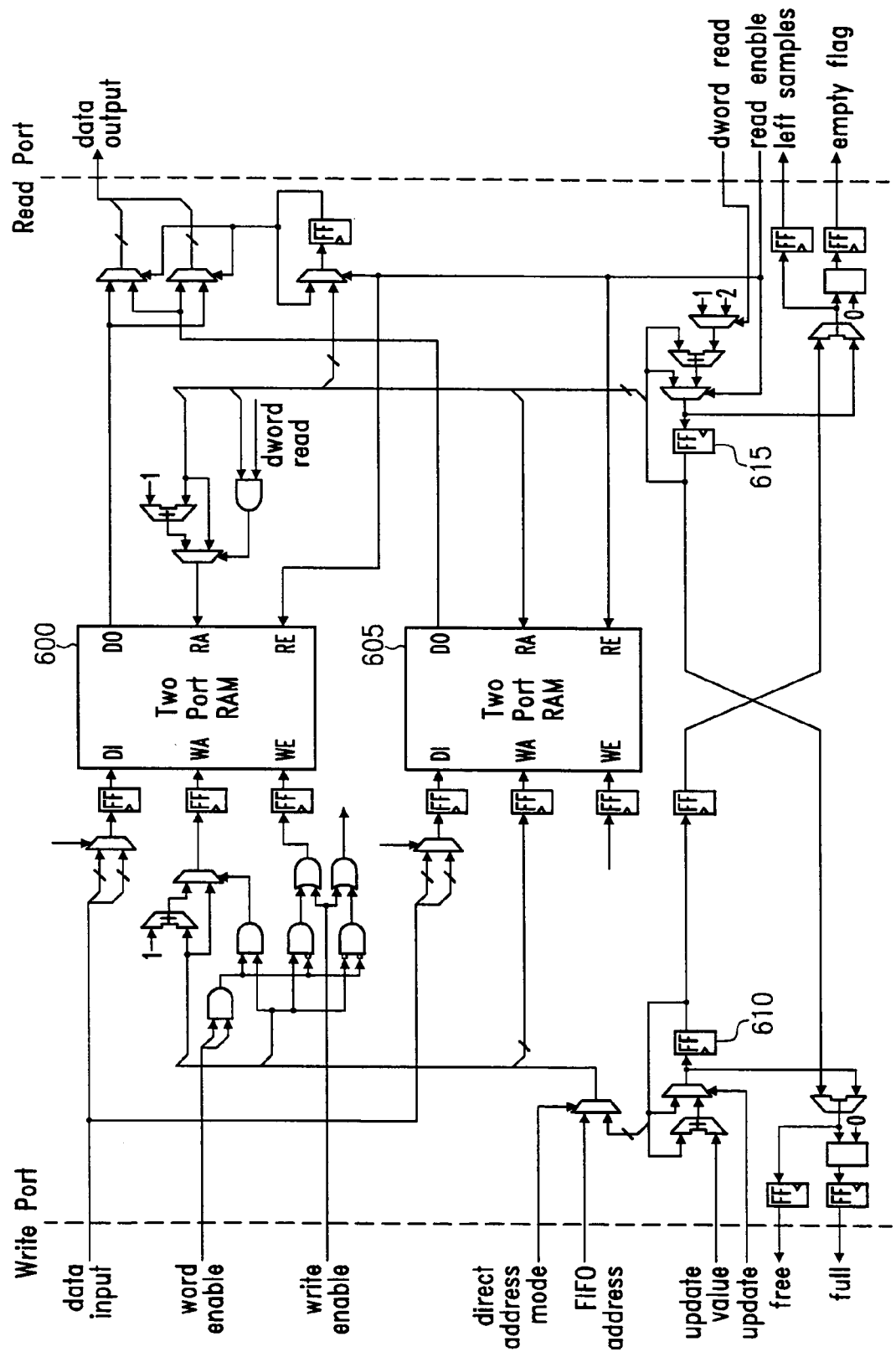
FIG. 6 illustrates the components of the buffer unit according to an embodiment.

Turning now to FIG. 6, the components of shared SATA buffer 325 are depicted according to an embodiment. The buffer 325 provides a 32-bit read and write data port, has a configurable depth of, for instance, 128 dwords, enables word/dword-wise read and write operations, enables concurrent read and write processes, allows to write to direct FIFO addresses (word aligned with 8-bit wide addresses), enables a FIFO flash (i.e., a reset of the read and write pointers), and provides status signals such as full, empty, samples left, and free bufferspace.

The shared SATA speed matching FIFO of FIG. 6 may support response reordering for host-to-device DMA transfers. Thus, it is possible to write data into the FIFO using a direct address (FIFO address) stored in the bus master response table rather than the internal write pointer. The write pointer may be used to calculate the number of valid samples written into the FIFO 325. Direct addressing may be enabled by asserting the direct address mode signal. After some amount of data has been written into the FIFO 325 using direct addressing, the write pointer may be updated. The update value signal specifies the number of words to implement the pointer with. The FIFO write pointer may be updated when the update signal is sampled asserted. Two clock cycles after updating the write pointer, the left samples signal indicates the new amount of valid data visible at the FIFO read port.

In the present embodiment, the SATA controller unit 310 or the target interface unit 320 do not write the FIFO 325 in direct addressing mode. In this case, the write pointer may be updated with each write access. Thus, the update signal is connected to the negated write enable signal whereas the update value signal toggles between 2 and 1 for dword-wise or word-wise accesses. The direct address mode signal may then be fixed to logic 0. For the block reading from the FIFO 325, it may not be visible whether the FIFO 325 is written in direct addressing mode or not.

PIO and DMA data is transferred via the uplink internal high-speed interface in either word or dword quantities, and a data frame arriving from the device may also contain an odd number of words. Hence, it may be possible to read and write the shared FIFO 325 also in word quantities. The word enable signal may then be used to enable the most and least significant word of the FIFO data input. If the dword read signal is asserted, data is read in dword quantities. Otherwise, the least significant word of the data output contains the valid word read from the FIFO 325.

To enable word-wise and dword-wise accesses, the FIFO 325 contains two 16-bit wide two-port RAM devices 600, 605, both with a 16-bit data port and a capacity of 128 words. Thus, it may be possible to read or write one dword with a word aligned address offset.

Read and write pointers 615, 610 of the present embodiment are nine bits in width (one bit more than the FIFO address) to be able to distinguish between a full and an empty fill level when comparing the read and write pointers. Thus, the most significant bit of the read pointer 615 may be inverted before the write pointer 610 is subjected in order to calculate the full signal and the free signal.

All write port inputs of the two-port RAM devices 600, 605 may be registered to ensure proper timing. Thus, the write pointer 610 may likewise be registered before being compared to the read pointer 615 in order to calculate the empty flag signal and the left samples signal. Otherwise, the information that something has been written to the RAM may have propagated faster to the read port than the data is available in the RAM.

In the present embodiment, the FIFO 325 is accessed at its read and write port with the same clock, so that no clock synchronization is required.

Figure 7:
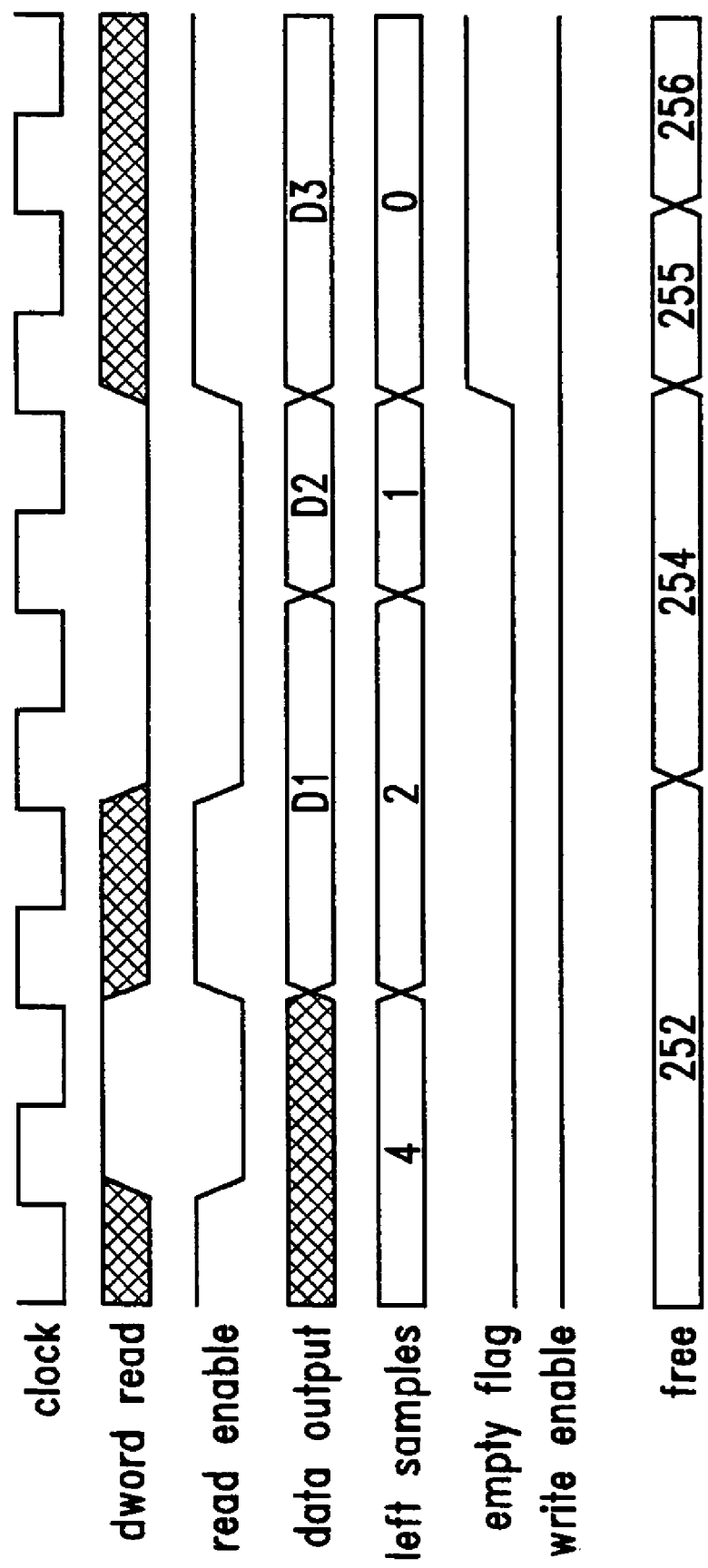
FIG. 7 is a timing diagram illustrating the read port behavior of the buffer unit according to an embodiment.
Figure 8:
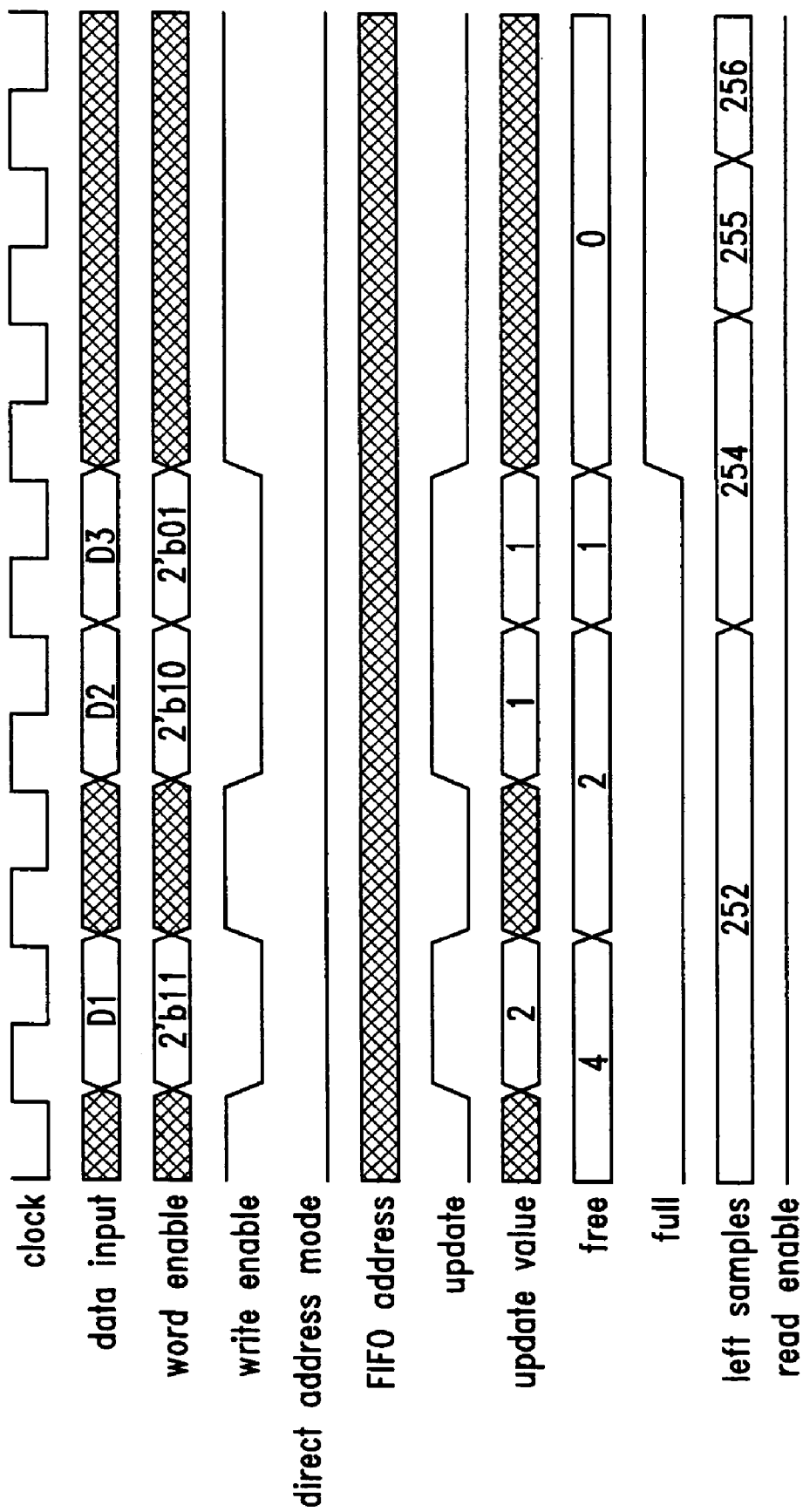
FIG. 8 is a timing diagram illustrating the write port behavior of the buffer unit in a default mode according to an embodiment.
Figure 9:
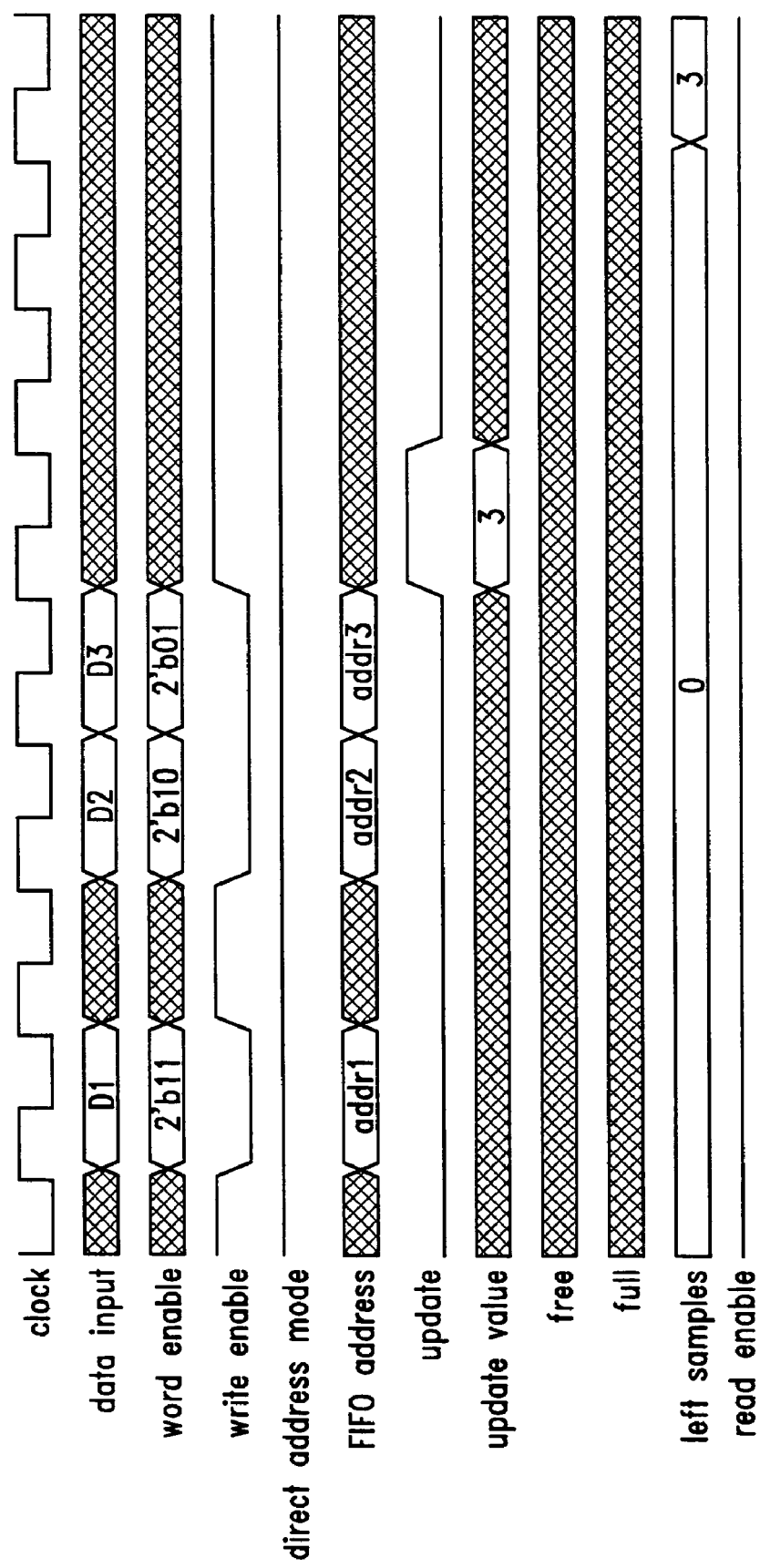
FIG. 9 is a timing diagram illustrating the write port behavior of the buffer unit in a direct addressing mode according to an embodiment.

FIGS. 7 to 9 are timing diagrams illustrating the interface signal timing. In FIG. 7, the read port behavior is illustrated. The write port behavior is shown in FIGS. 8 and 9 in the default mode (FIG. 8) and the direct addressing mode (FIG. 9). In the direct addressing mode, the free signal and the full signal are not being used.

In FIGS. 6 to 9, the clock signal is the read-write clock. All flipflops are triggered to the rising edge of this signal. The data input is 32 bits wide. The word enable signal enables the least significant word with bit 0 and the most significant word with bit 1. The write enable signal is low active. The direct address mode signal is a high active signal to enable the write port direct addressing mode. The FIFO address signal is the 8-bit wide direct FIFO word address. The update signal updates the write pointer and is high active. The update value signal is added to the write pointer if sampled asserted. The update value signal specifies the number of words to be added to the write pointer. The free signal specifies the available free FIFO space in word quantities. The full signal is a 1-bit flag. The flash signal is high active to reset the read and write pointers. The data output signal is 32 bits wide. The read enable signal is low active. The left samples signal specifies the number of left samples in the FIFO in words.

Figure 10:
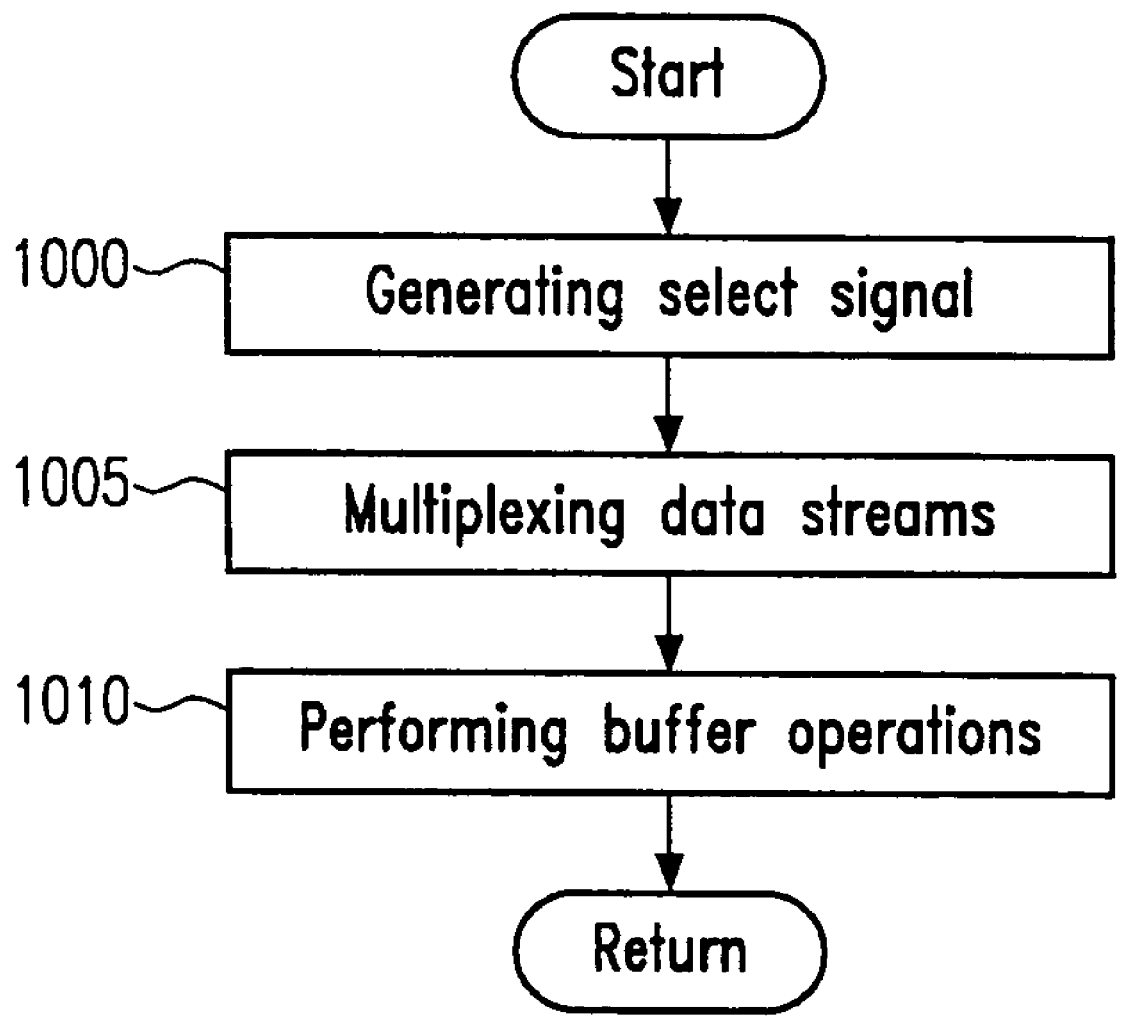
FIG. 10 is a flow chart illustrating steps that may be used in an embodiment to operate the buffer unit.

Turning now to FIG. 10, the host controller may be operated by generating a select signal in step 1000 to control the multiplexer 330, as described above. Dependent on the select signal, the multiplexer 330 selects one of the received data streams in step 1005 and submits the selected data stream to the buffer unit 325. The buffer 325 then performs the buffer operations discussed above (step 1010).

To summarize, the embodiments enable the common usage of one data buffer for PIO and DMA modes in both directions. In an embodiment, the DMA mode is a UDMA mode.

The full SATA data rate is provided for the common operation mode with enough elasticity to variations of the supplied HyperTransport data.

The provided architecture facilitates a chip area optimized implementation. The required combinational logic, finite state machines and configuration registers may be optimized best by synthesis tools. Through utilizing one shared FIFO to buffer the host-to-device and device-to-host data streams for PIO and DMA transfers, data buffering is done most efficiently.

Moreover, the design is modular to be able to reuse submodules for other projects or purposes. The host interface unit 305 interfaces the SATA controller unit 310 via the PIO and FIFO interface. Thus, it is possible to use the host interface unit block 305 not only for an SATA implementation, but also as IDE controller host interface. The IDE controller then supplies the parallel interface and the different PIO/DMA timings as they are defined within the ATA/ATAPI specification.

It is to be noted that not only the total amount of memory is reduced by using one shared buffer instead of four separated ones. Moreover, some combinational area is saved too, because the buffer control logic is instantiated only once.

In addition, the shared buffer 325 provides a simple data interface to the transport layer unit in the SATA controller unit 310. Thus, the transport layer unit does not need to supply different data interfaces for DMA and PIO accesses. The transport layer unit does not need to distinguish between PIO and DMA data. This is done by the FIFO multiplexer 330, which then only needs a signal from the transport layer unit.

It is further to be noted that a large shared FIFO 325 provides more elasticity for device-to-host DMA and PIO data transfers.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An SATA (Serial AT Attachment) host controller capable of performing host-to-device and device-to-host communications, the host controller being operable in a PIO (Programmed I/O) data transfer mode and a DMA (Direct Memory Access) data transfer mode, the host controller comprising:
a buffer unit for buffering data; and
a data stream selection unit for selecting a data stream for submission to said buffer unit,
wherein the data stream selection unit is connected to receive at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode, and select from said received data streams the data stream to be submitted to said buffer unit.

2. The SATA host controller of claim 1, further comprising:
a bus master engine for performing host-to-device and device-to-host communications in the DMA data transfer mode by accessing host memory,
wherein said bus master engine is connected to said buffer unit for receiving said device-to-host data stream in the DMA data transfer mode, and to said data stream selection unit for providing said host-to-device data stream in said DMA data transfer mode.

3. The SATA host controller of claim 2, wherein said bus master engine is arranged to support at least five outstanding read requests.

4. The SATA host controller of claim 2, wherein said bus master engine is arranged to request bursts with the maximum burst length in response to physical region descriptors.

5. The SATA host controller of claim 2, wherein said buffer unit is arranged to provide a first status signal to said bus master engine when performing device-to-host communications, said first status signal indicating that the current buffer fill level is equal to or above a first predefined fill level.

6. The SATA host controller of claim 5, wherein said buffer unit is further arranged to provide a second status signal to said bus master engine when performing device-to-host communications, said second status signal indicating the current fill level is equal to or below a second predefined fill level.

7. The SATA host controller of claim 6, wherein said second predefined fill level is lower than said first predefined fill level.

8. The SATA host controller of claim 6, wherein said first predefined fill level defines free buffer capacity of 44 double words.

9. The SATA host controller of claim 6, wherein said second predefined fill level defines free buffer capacity of 48 double words.

10. The SATA host controller of claim 1, further comprising:
a target interface unit for performing host-to-device and device-to-host communications in the PIO data transfer mode,
wherein said target interface unit is connected to said buffer unit for receiving said device-to-host data stream in the PIO data transfer mode, and to said data stream selection unit for providing said host-to-device data stream in said PIO data transfer mode.

11. The SATA host controller of claim 1, further comprising:
an SATA controller unit for controlling data transfer to and from a physical interface unit,
wherein said SATA controller unit is connected to said buffer unit for receiving host-to-device data, and to said data stream selection unit for providing device-to-host data, in both the DMA and the PIO data transfer modes.

12. The SATA host controller of claim 1, wherein said buffer unit is arranged to have a buffer capacity of six or more cachelines when buffering data relating to host-to-device communications in the DMA data transfer mode.

13. The SATA host controller of claim 1, wherein said buffer unit is arranged to have a buffer capacity of five or more cachelines when buffering data relating to device-to-host communications in the DMA data transfer mode.

14. The SATA host controller of claim 1, wherein said buffer unit is arranged to have a buffer capacity of two 32-bit registers when buffering data relating to host-to-device communications in the PIO data transfer mode.

15. The SATA host controller of claim 1, wherein said buffer unit is arranged to have a buffer capacity of at least 45 double words when buffering data relating to device-to-host communications in the PIO data transfer mode.

16. The SATA host controller of claim 1, wherein said buffer unit is operable in a FIFO (First In First Out) mode for writing data to said buffer unit.

17. The SATA host controller of claim 1, wherein said buffer unit is operable in a FIFO (First In First Out) mode for reading data from said buffer unit.

18. The SATA host controller of claim 1, wherein said buffer unit is operable in a direct addressing mode for writing data to said buffer unit.

19. The SATA host controller of claim 18, wherein said buffer unit is operable in said direct addressing mode for writing data of said host-to-device data stream in the direct memory access data transfer mode to said buffer unit.

20. The SATA host controller of claim 1, wherein said buffer unit is controlled to output read responses pertaining to said host-to-device data stream in the direct memory access data transfer mode, in a reordered sequence.

21. The SATA host controller of claim 1, wherein said buffer unit comprises a first two-port RAM (Random Access Memory) device and a second two-port RAM device.

22. The SATA host controller of claim 1, wherein said data stream selection unit is a multiplexer unit.

23. The SATA host controller of claim 1, wherein said DMA data transfer mode is a UDMA (Ultra DMA) data transfer mode.

24. A storage device host controller capable of performing host-to-device and device-to-host communications, the host controller being operable in a programmed input/output data transfer mode and a direct memory access data transfer mode, the host controller comprising:
a buffer unit for buffering data; and
a data stream selection unit for selecting a data stream for submission to said buffer unit,
wherein said data stream selection unit is connected to receive at any one time at least one of a host-to-device data stream in the programmed input/output data transfer mode, a host-to-device data stream in the direct memory access data transfer mode, a device-to-host data stream in the programmed input/output data transfer mode, and a device-to-host data stream in the direct memory access data transfer mode, and select from said received data streams the data stream to be submitted to said buffer unit.

25. An integrated circuit chip for performing host-to-device and device-to-host ATA (AT Attachment) communications in a PIO (Programmed I/O) data transfer mode and a DMA (Direct Memory Access) data transfer mode, the integrated circuit chip comprising:
a buffer circuit for buffering data; and
a data stream selection circuit for selecting a data stream for submission to said buffer circuit,
wherein said data stream selection circuit is connected to receive at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode, and select from said received data streams the data stream to be submitted to the buffer circuit.

26. A method of operating an SATA (Serial ATA) host controller to perform host-to-device and device-to-host communications in a PIO (Programmed I/O) data transfer mode, and a DMA (Direct Memory Access) data transfer mode, comprising:
receiving at any one time at least one of a host-to-device data stream in the PIO data transfer mode, a host-to-device data stream in the DMA data transfer mode, a device-to-host data stream in the PIO data transfer mode, and a device-to-host data stream in the DMA data transfer mode;
selecting from said received data streams a data stream to be buffered; and
buffering data of the selected data stream in a buffer unit.

27. The method of claim 26, further comprising the step of:
operating a bus master engine for performing host-to-device and device-to-host communications in the DMA data transfer mode by accessing host memory, said step of operating the bus master engine comprising:
receiving said device-to-host data stream in the DMA data transfer mode from said buffer unit; and
providing said host-to-device data stream in said DMA data transfer mode to be selected.

28. The method of claim 27, wherein said step of operating the bus master engine is arranged to support at least five outstanding read requests.

29. The method of claim 27, wherein said step of operating the bus master engine comprises:
requesting bursts with the maximum burst length in response to physical region descriptors.

30. The method of claim 27, wherein the step of buffering data comprises:
providing a first status signal to said bus master engine when performing device-to-host communications, said first status signal indicating that the current buffer fill level of the buffer unit is equal to or above a predefined fill level.

31. The method of claim 30, wherein said step of buffering data further comprises:
providing a second status signal to said bus master engine when performing device-to-host communications, said second step signal indicating that the current fill level is equal to or below a second predefined fill level.

32. The method of claim 31, wherein said second predefined fill level is lower than said first predefined fill level.

33. The method of claim 31, wherein said first predefined fill level defines free buffer capacity of 44 double words.

34. The method of claim 31, wherein said second predefined fill level defines free buffer capacity of 48 double words.

35. The method of claim 26, further comprising;
operating a target interface unit for performing host-to-device and device-to-host communications in the PIO data transfer mode, the step of operating the target interface unit comprising:
receiving said device-to-host data stream in the PIO data transfer mode from said buffer unit; and
providing said host-to-device data stream in said PIO data transfer mode.

36. The method of claim 26, further comprising:
controlling data transfer to and from a physical interface unit in an SATA controller unit, said SATA controller unit being operated by receiving host-to-device data from said buffer unit and providing device-to-host data to be selected, in both the DMA and the PIO data transfer modes.

37. The method of claim 26, wherein said step of buffering data comprises buffering six or more cachelines when performing host-to-device communications in the DMA data transfer mode.

38. The method of claim 26 wherein said step of buffering data comprises buffering five or more cachelines when performing device-to-host communications in the DMA data transfer mode.

39. The method of claim 26, wherein the step of buffering data comprises operating two 32-bit registers when buffering data relating to the host-to-device communications in the PIO data transfer mode.

40. The method of claim 26, wherein the step of buffering data comprises buffering at least 45 double words when performing device-to-host communications in the PIO data transfer mode.

41. The method of claim 26, wherein the step of buffering data comprises:
operating said buffer unit in a FIFO (First In First Out) mode for writing data to said buffer unit.

42. The method of claim 26, wherein buffering data comprises:
operating said buffer unit in a FIFO (First In First Out) mode for reading data from said buffer unit.

43. The method of claim 26, wherein buffering data comprises:
operating said buffer unit in a direct addressing mode for writing data to said buffer unit.

44. The method of claim 43, wherein said buffer unit is operable in said direct addressing mode for writing data of said host-to-device data stream in the direct memory access data transfer mode to said buffer unit.

45. The method of claim 26, further comprising:
outputting buffered read responses pertaining to said host-to-device data stream in the direct memory access data transfer mode, in a reordered sequence.

46. The method of claim 26, wherein buffering data comprises:
operating a first two-port RAM (Random Access Memory) device; and
operating a second two-port RAM device.

47. The method of claim 26, wherein said step of selecting a data stream comprises multiplexing the received data streams.

48. The method of claim 26, wherein said DMA data transfer mode is a UDMA (Ultra DMA) data transfer mode.

49. A method of operating a storage device host controller to perform host-to-device and device-to-host communications in a programmed input/output data transfer mode and a direct memory access data transfer mode, the method comprising:
receiving at any one time at least one of a host-to-device data stream in the programmed input/output data transfer mode, a host-to-device data stream in the direct memory data transfer mode, a device-to-host data stream in the programmed input/output data transfer mode, and a device-to-host data stream in the direct memory access data transfer mode;
selecting from said received data streams a data stream to be buffered; and
buffering data of the selected data stream in a buffer unit.

* * * * *